US012561799B2

(12) United States Patent
Ehlers et al.

(10) Patent No.: US 12,561,799 B2
(45) Date of Patent: Feb. 24, 2026

(54) AUTOMATED QUALITY EVALUATION OF OPTICAL COHERENCE TOMOGRAPHY IMAGES

(71) Applicant: THE CLEVELAND CLINIC FOUNDATION, Cleveland, OH (US)

(72) Inventors: Justis P. Ehlers, Cleveland, OH (US); Duriye Damla Sevgi, Cleveland, OH (US); Sunil K. Srivastava, Cleveland, OH (US); Jon Whitney, Cleveland, OH (US); Jordan Bell, Cleveland, OH (US)

(73) Assignee: THE CLEVELAND CLINIC FOUNDATION, Cleveland, OH (US)

( * ) Notice: Subject to any disclaimer, the term of this patent is extended or adjusted under 35 U.S.C. 154(b) by 715 days.

(21) Appl. No.: 17/734,870

(22) Filed: May 2, 2022

(65) Prior Publication Data

US 2022/0351376 A1     Nov. 3, 2022

Related U.S. Application Data

(60) Provisional application No. 63/182,919, filed on May 1, 2021.

(51) Int. Cl.
*G06T 7/00* (2017.01)
*G06V 10/26* (2022.01)
(Continued)

(52) U.S. Cl.
CPC ............ *G06T 7/0012* (2013.01); *G06V 10/26* (2022.01); *G06V 10/44* (2022.01); *G06V 10/764* (2022.01);
(Continued)

(58) Field of Classification Search
CPC ......... G06T 7/0012; G06T 2207/10101; G06T 2207/30041; G06T 2207/30168;
(Continued)

(56) References Cited

U.S. PATENT DOCUMENTS

2014/0268040 A1*  9/2014  Mujat ...................... A61B 3/14
                                                        351/246
2014/0268046 A1*  9/2014  Narasimha-Iyer ........ G06T 5/70
                                                        351/246

(Continued)

OTHER PUBLICATIONS

Lauermann JL, Treder M, Alnawaiseh M, Clemens CR, Eter N, Alten F. Automated OCT angiography image quality assessment using a deep learning algorithm. Graefes Arch Clin Exp Ophthalmol. Aug. 2019;257(8):1641-1648. doi: 10.1007/s00417-019-04338-7. Epub May 22, 2019. PMID: 31119426.

(Continued)

*Primary Examiner* — Van D Huynh
(74) *Attorney, Agent, or Firm* — Tarolli, Sundheim, Covell & Tummino LLP

(57) ABSTRACT

Systems and methods are provided for evaluating a quality of an OCT image. The system includes a processor and a non-transitory computer readable medium that stores instructions executable by a processor to evaluate the quality of the OCT image. The executable instructions include an imager interface that receives an OCT image from an associated OCT imager and a feature extractor that generates at least one feature from the OCT image. An image evaluator (Continued)

300

302
SEGMENT AN OPTICAL COHERENCE TOMOGRAPHY (OCT) IMAGE TO GENERATE A BOUNDARY OF A RETINAL SUBLAYER AND A CONFIDENCE SCORE FOR THE SEGMENTATION

304
ASSIGN AN IMAGE QUALITY METRIC TO THE OCT IMAGE FROM AT LEAST THE CONFIDENCE SCORE FOR THE SEGMENTATION

306
DISPLAY AN OUTPUT REPRESENTING THE ASSIGNED IMAGE QUALITY METRIC TO A USER determines an image quality metric from the at least one feature, and a user interface provides an output representing the image quality metric to a display.

13 Claims, 3 Drawing Sheets

(51) Int. Cl.

| | |
|---|---|
| *G06V 10/44* | (2022.01) |
| *G06V 10/764* | (2022.01) |
| *G06V 10/774* | (2022.01) |
| *G06V 10/82* | (2022.01) |

(52) U.S. Cl.
CPC ............ *G06V 10/774* (2022.01); *G06V 10/82* (2022.01); *G06T 2207/10101* (2013.01); *G06T 2207/30041* (2013.01); *G06T 2207/30168* (2013.01)

(58) Field of Classification Search
CPC ............. G06T 7/00; G06T 2207/10016; G06T 2207/20072; G06T 2207/20076; G06T 7/12; G06T 2207/20081; G06T 2207/20084; G06V 10/26; G06V 10/44; G06V 10/764; G06V 10/774; G06V 10/82; G06V 10/454; G06V 2201/03; G06V 10/993
See application file for complete search history.

(56) References Cited

U.S. PATENT DOCUMENTS

| | | | | |
|---|---|---|---|---|
| 2015/0327761 | A1* | 11/2015 | Narasimha-Iyer ..... | A61B 3/145 |
| | | | | 351/246 |
| 2016/0227999 | A1* | 8/2016 | An ........................ | G06T 7/0014 |
| 2021/0319551 | A1* | 10/2021 | Mei ........................... | G06T 7/62 |
| 2021/0378505 | A1* | 12/2021 | Sobol ..................... | A61B 3/102 |
| 2022/0319070 | A1* | 10/2022 | Pellegrini ........... | G06V 40/193 |
| 2023/0162366 | A1* | 5/2023 | Bagherinia ............ | G06T 7/174 |
| | | | | 382/128 |
| 2023/0306568 | A1* | 9/2023 | Nishida ..................... | G06T 7/30 |
| 2023/0410293 | A1* | 12/2023 | De Sisternes ......... | G06T 7/0012 |
| 2024/0185627 | A1* | 6/2024 | Yoo ........................ | G16H 50/70 |

OTHER PUBLICATIONS

Tennakoon, Ruwan, et al. "Image quality classification for DR screening using convolutional neural networks." Ophthalmic Medical Image Analysis International Workshop. vol. 3. No. 2016. University of Iowa, 2016.
Al-Sheikh, Mayss, et al. "Impact of image quality on OCT angiography based quantitative measurements." International journal of retina and vitreous 3.1 (2017): 1-6.

* cited by examiner

300

302

SEGMENT AN OPTICAL COHERENCE TOMOGRAPHY (OCT) IMAGE TO GENERATE A BOUNDARY OF A RETINAL SUBLAYER AND A CONFIDENCE SCORE FOR THE SEGMENTATION

304

ASSIGN AN IMAGE QUALITY METRIC TO THE OCT IMAGE FROM AT LEAST THE CONFIDENCE SCORE FOR THE SEGMENTATION

306

DISPLAY AN OUTPUT REPRESENTING THE ASSIGNED IMAGE QUALITY METRIC TO A USER

AUTOMATED QUALITY EVALUATION OF OPTICAL COHERENCE TOMOGRAPHY IMAGES

RELATED APPLICATIONS

This application claims priority to U.S. Provisional Patent Application Ser. No. 63/182,919 ("the '919 application"), filed May 1, 2021 and entitled AUTOMATED EVALUATION OF OPTICAL COHERENCE TOMOGRAPHY IMAGES. The entirety of the '919 application is hereby incorporated by reference.

TECHNICAL FIELD

This disclosure relates to medical imaging and, more particularly, to automated quality evaluation of optical coherence tomography images.

BACKGROUND

Optical coherence tomography, (OCT), is a technique for obtaining sub-surface images of translucent or opaque materials at a resolution equivalent to a low-power microscope. OCT has attracted interest among the medical community because it provides tissue morphology imagery at much higher resolution than other imaging modalities such as MRI or ultrasound. OCT delivers high resolution because it is based on light, rather than sound or radio frequency. An optical beam is directed at the tissue, and a small portion of this light that reflects from sub-surface features is collected. Most light is not reflected but, rather, scatters off at large angles. In conventional imaging, this diffusely scattered light contributes background that obscures an image. However, in OCT, a technique called interferometry is used to record the optical path length of received photons allowing rejection of most photons that scatter multiple times before detection. Thus, OCT can build up clear three-dimensional images of thick samples by rejecting background signal while collecting light directly reflected from surfaces of interest.

SUMMARY

In one example, a system is provided for evaluating a quality of an OCT image. The system includes a processor and a non-transitory computer readable medium that stores instructions executable by a processor to evaluate the quality of the OCT image. The executable instructions include an imager interface that receives an OCT image from an associated OCT imager and a feature extractor that generates at least one feature from the OCT image. An image evaluator determines an image quality metric from the at least one feature, and a user interface provides an output representing the image quality metric to a display.

In another example, a method is provided for evaluating the quality of an OCT image. An OCT image is segmented to generate a boundary of a retinal sublayer and a confidence score for the segmentation. An image quality metric is assigned to the OCT image from at least the confidence score for the segmentation, and an output representing the assigned image quality metric is displayed to a user.

In yet another example, a method is provided for evaluating the quality of an OCT image. A plurality of features including statistical values derived from pixel intensity values are extracted from the OCT image, and an image quality metric to the OCT image is assigned from at least the plurality of features. An output representing the assigned image quality metric is displayed to a user.

DETAILED DESCRIPTION

Image quality is an important factor when reading ophthalmic images for clinical trials. Poor quality scans both take longer to analyze, and the final results are less reliable. Unfortunately, image quality is subjective. Several approaches exist to tackle this problem, such as material tissue contrast index (mTCI) or Heidelberg Engineering's Q-score, but they often do not capture subtle imaging characteristics that differentiate gradable scans from ungradable ones. The inventors propose an effective quality classifier that is sensitive to these variations to increase the efficiency of clinical trials while improving the quality of the resulting data.

As used herein, a "categorical parameter" is a parameter that can take on any of at least three discrete values representing various categories.

An "image quality metric," as used herein, is a continuous or categorical parameter representing the suitability of an OCT image for analysis by a user.

Figure 1:
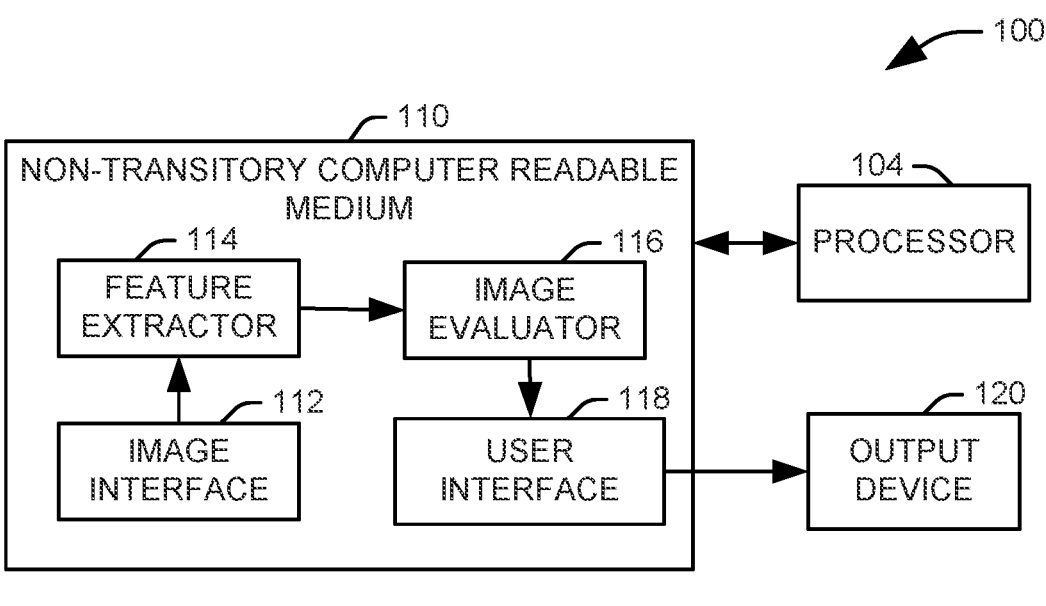
FIG. 1 illustrates a functional block diagram of an example of a system for evaluating a quality of an optical coherence tomography (OCT) image.

FIG. 1 illustrates one example of a system for evaluating a quality of an OCT image. The system 100 includes a processor 102 and a non-transitory computer readable medium 110 storing executable instructions for evaluating the donor lung. The executable instructions include an imager interface 112 that receives an OCT image from an associated OCT imager. A feature extractor 114 generates at least one feature from the OCT image. In one implementation, the feature extractor 114 includes a segmentation component (not shown) that segments the OCT image to generate a boundary of a retinal sublayer and a confidence score for the segmentation, with the confidence score for the segmentation used as a feature. For example, the confidence score for the segmentation as a percentage of pixels along one axis of the image for which the boundary of the retinal sublayer is detected. In one implementation, the feature extractor 114 includes a convolutional neural network trained on a set of OCT images segmented by experts that provides the segmentation and the confidence score.

Additionally or alternatively, the feature extractor 114 can generate a plurality of features from the pixel intensity values of the OCT image. In one example, the plurality of features includes a set of descriptive statistics derived from pixel signal intensity values within the image that includes at least one of a measure of central tendency of the pixel signal intensity values, a measure of deviation of the pixel signal intensity values, a kurtosis of the distribution of the pixel signal intensity values, a skew of the distribution of the pixel signal intensity values, and a measure of homogeneity of the pixel signal intensity values. In another example, the set of descriptive statistics includes each of a measure of central tendency of the pixel signal intensity values, a measure of deviation of the pixel signal intensity values, a kurtosis of the distribution of the pixel signal intensity values, a skew of the distribution of the pixel signal intensity values, and a measure of homogeneity of the pixel signal intensity values.

An image evaluator 116 determines an image quality metric from the at least one feature. In one example, the image evaluator comprises a machine learning model, such as a random forest classifier, trained on a set of OCT images having associated sets of the plurality of features, that provides the image quality metric from the plurality of features associated with the OCT image. A user interface 118 that provides an output representing the determined image quality metric to an output device 120. In one implementation, the output is a categorical parameter that can assume at least a first value, representing an image suitable for analysis by a user, and a second value, representing an image that is not suitable for analysis.

Figure 2:
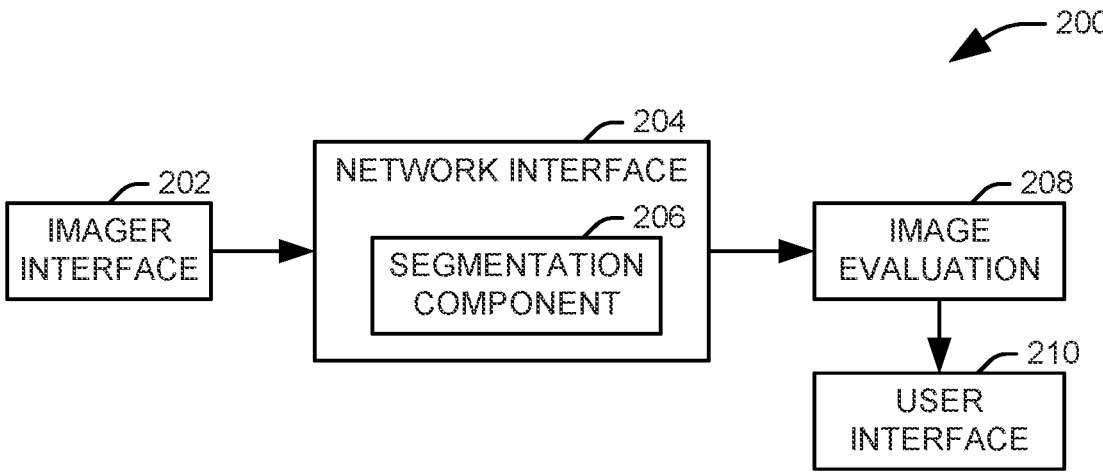
FIG. 2 illustrates a functional block diagram of another example of a system for evaluating a quality of an OCT image.

FIG. 2 illustrates a functional block diagram of an example of a system 200 for automated quality assessment of optical coherence tomography (OCT) images. In one implementation, the illustrated system 200 provides an automated quality assessment of spectral domain OCT images to determine an optimal image for retinal layer segmentation. The objective and robust image selection provided by the system can significantly improve the speed, consistency, and objectivity of disease burden and activity assessment. In the illustrated example, the system 200 segments a plurality of retinal layers in each OCT image to produce a confidence score associated with the segmentation. The confidence score can represent, for example, the percentage of the retinal layer boundaries that could be determined directly via the segmentation algorithm, as opposed to being extrapolated from other points. Statistical features representing the image are also be extracted, and a metric representing image quality is then generated from these features and the segmentation confidence score. It will be appreciated that the system 200 and each component element 202, 204, 206, 208, 210 can be implemented as software instructions executed by an associated processor, dedicated hardware (e.g., an application specific integrated surface or a field programmable gate array), or a combination of software instructions and dedicated hardware The system 200 includes an imager interface 202 that receives a sequence of OCT images from an OCT imaging device. It will be appreciated that the OCT imaging device can comprise any OCT scanner, including time domain OCT scanners, spectral domain OCT scanners, and swept source scanners. In one example, a plurality of two-dimensional image slices can be captured to represent the retina. A feature extractor 204 extracts a plurality of features from the OCT image, each comprising statistical values derived from pixel intensity values. In one example, the feature extractor 204 determines a set of descriptive statistics for the pixel-level signal intensity including one or more measures of central tendency (arithmetic mean, median, geometric mean, etc.), one or more measures of deviation (standard deviation, variance, interquartile range, etc.), a skew of the distribution of intensity values, a kurtosis of the distribution of intensity values, and one or more measures of homogeneity of the intensity values.

In one implementation, each of these feature values is calculated for each OCT slice and then averaged across all OCT slices to provide an overall value for the OCT image. Alternatively or additionally, specific regions of the image can be weighted based on the therapeutic purpose of the image. For example, in some implementations, the central slices of the OCT images can be weighted more heavily in generating features for the image as a hole for most images, but when a potential diagnosis of the patient requires high fidelity for the periphery of the eye, this weighting can be removed or even reversed, with peripheral slices of the OCT weighted more heavily.

The feature extractor 204 includes a segmentation component 206 then produces at least one segmentation boundary of a retinal sublayer and an associated confidence score for the segmentation. For example, the boundaries can include the boundaries of any or all of the internal limiting membrane, the outer nuclear layer, the ellipsoid zone, the retinal pigment epithelium, and Bruch's membrane. The segmentation component 206 can segment the retinal layers via any appropriate segmentation technique, including, for example, region growing techniques, watershed techniques, deformable model/energy minimization techniques, Markov random field models, clustering-based techniques, graph cut techniques, neural networks, and hybrids of these various approaches. In one implementation, the segmentation component 206 includes a convolutional neural network, trained on images segmented by human experts, that generates the retinal boundary from, a provided image. In general, where the retinal boundary is not well-defined in the image, the segmentation algorithm may either fail to produce a plausible result (e.g., a boundary point that is discontinuous with surrounding points) or fail to reach a threshold confidence for accepting the result. In these cases, an appropriate point can be determined indirectly, for example, via extrapolation or interpolation, as opposed to being determined directly by the segmentation algorithm. The confidence score for the segmentation can be a function of an amount or percentage of the retinal boundary that is determined directly. Alternatively, where the segmentation is performed using a neural network, the confidence value can be derived from one or more hidden values of the neural network. It will be appreciated that the confidence score can be calculated at the level of individual A-scan, averaged across a B-scan, or across a macular cube. The segmentation maps generated at the segmentation component 206 can also be used as model inputs demonstrating artifactual segmentation.

In another implementation, an autoencoder model can be trained to recreate images from the segmented mask. An autoencoder is a type of artificial neural network used to learn efficient coding of unlabeled data, with the encoding is validated and refined by attempting to regenerate the input from the encoding. The autoencoder learns a representation for a set of data, referred to as an encoding, by training the network to ignore insignificant data, and refines the encoding process by reconstructing the encoded image. The confidence of the autoencoder in recreate the image can be used instead of or in addition to a confidence from the segmentation component 206.

An image evaluation component 208 generates a metric representing the quality of each OCT image based on at least the confidence score. Additionally or alternatively, other image features can be extracted from the image at It will be appreciated that the image evaluation component 208 can determine the image quality metric as a continuous parameter, in which case the image quality is expressed as a numerical value, or a categorical parameter, with a series of categorical values having an ordinal ranking. In one implementation, the categorical values can include a "good" value, indicating an image with minimal defects that is suitable for grading, a "fair" value, representing an image that is gradable despite notable defects, and a "poor" value, representing an ungradable image. Where the metric is a continuous parameter, it will be appreciated that either high values of the metric or low values of the metric can represent high quality images, depending on how the metric is calculated.

The image evaluation component 208 can utilize one or more machine learning models, implemented, for example, as classification and regression models, each of which analyze provided data to assign a clinical parameter to the user. Where multiple classification and regression models are used, the image evaluation component 208 can include an arbitration element can be utilized to provide a coherent result from the various algorithms. Depending on the outputs of the various models, the arbitration element can simply select a class from a model having a highest confidence, select a plurality of classes from all models meeting a threshold confidence, select a class via a voting process among the models, or assign a numerical parameter based on the outputs of the multiple models. Alternatively, the arbitration element can itself be implemented as a classification model that receives the outputs of the other models as features and generates one or more output classes for the patient. The classification can also be performed across multiple stages. In one example, an a priori probability can be determined for a clinical parameter without the one or more values representing the patient. A second stage of the model can use the one or more values representing the patient, and, optionally, additional values, to generate a value for the clinical parameter. A known performance of the second stage of the machine learning model, for example, defined as values for the specificity and sensitivity of the model, can be used to update the a priori probability given the output of the second stage.

In one example, the constituent models can be trained for analysis of specific retinal boundaries and specific pathologies. In another example, the constituent models can be trained to detect specific image quality issues. For example, the models can include a "slanted" scan detector, and a "deep bowl" detector that are both used to detect specific anomalous scans and unique quality issues.

The image evaluation component 208, as well as any constituent models, can be trained on training data representing training images. For example, in supervised learning models, a set of example images having labels representing the image quality can be used to train the image evaluation component 208. The training process of the image evaluation component 208 will vary with its implementation, but training generally involves a statistical aggregation of training data into one or more parameters associated with the output classes. For rule-based models, such as decision trees, domain knowledge, for example, as provided by one or more human experts, can be used in place of or to supplement training data in selecting rules for classifying a user using the extracted features. Any of a variety of techniques can be utilized for the models, including support vector machines, regression models, self-organized maps, k-nearest neighbor classification or regression, fuzzy logic systems, data fusion processes, boosting and bagging methods, rule-based systems, or artificial neural networks.

For example, an SVM classifier can utilize a plurality of functions, referred to as hyperplanes, to conceptually divide boundaries in the N-dimensional feature space, where each of the N dimensions represents one associated feature of the feature vector. The boundaries define a range of feature values associated with each class. Accordingly, an output class and an associated confidence value can be determined for a given input feature vector according to its position in feature space relative to the boundaries. An SVM classifier utilizes a user-specified kernel function to organize training data within a defined feature space. In the most basic implementation, the kernel function can be a radial basis function, although the systems and methods described herein can utilize any of a number of linear or non-linear kernel functions.

An ANN classifier comprises a plurality of nodes having a plurality of interconnections. The values from the feature vector are provided to a plurality of input nodes. The input nodes each provide these input values to layers of one or more intermediate nodes. A given intermediate node receives one or more output values from previous nodes. The received values are weighted according to a series of weights established during the training of the classifier. An intermediate node translates its received values into a single output according to a transfer function at the node. For example, the intermediate node can sum the received values and subject the sum to a binary step function. A final layer of nodes provides the confidence values for the output classes of the ANN, with each node having an associated value representing a confidence for one of the associated output classes of the classifier.

The classical ANN classifier is fully-connected and feedforward. Convolutional neural networks, however, includes convolutional layers in which nodes from a previous layer are only connected to a subset of the nodes in the convolutional layer. Recurrent neural networks are a class of neural networks in which connections between nodes form a directed graph along a temporal sequence. Unlike a feedforward network, recurrent neural networks can incorporate feedback from states caused by earlier inputs, such that an output of the recurrent neural network for a given input can be a function of not only the input but one or more previous inputs. As an example, Long Short-Term Memory (LSTM) networks are a modified version of recurrent neural networks, which makes it easier to remember past data in memory.

A k-nearest neighbor model populates a feature space with labelled training samples, represented as feature vectors in the feature space. In a classifier model, the training samples are labelled with their associated class, and in a regression model, the training samples are labelled with a value for the dependent variable in the regression. When a new feature vector is provided, a distance metric between the new feature vector and at least a subset of the feature vectors representing the labelled training samples is generated. The labelled training samples are then ranked according to the distance of their feature vectors from the new feature vector, and a number, k, of training samples having the smallest distance from the new feature vector are selected as the nearest neighbors to the new feature vector.

In one example of a classifier model, the class represented by the most labelled training samples in the k nearest neighbors is selected as the class for the new feature vector. In another example, each of the nearest neighbors can be represented by a weight assigned according to their distance from the new feature vector, with the class having the largest aggregate weight assigned to the new feature vector. In a regression model, the dependent variable for the new feature vector can be assigned as the average (e.g., arithmetic mean) of the dependent variables for the k nearest neighbors. As with the classification, this average can be a weighted average using weights assigned according to the distance of the nearest neighbors from the new feature vector. It will be appreciated that k is a metaparameter of the model that is selected according to the specific implementation. The distance metric used to select the nearest neighbors can include a Euclidean distance, a Manhattan distance, or a Mahalanobis distance.

A regression model applies a set of weights to various functions of the extracted features, most commonly linear functions, to provide a continuous result. In general, regression features can be categorical, represented, for example, as zero or one, or continuous. In a logistic regression, the output of the model represents the log odds that the source of the extracted features is a member of a given class. In a binary classification task, these log odds can be used directly as a confidence value for class membership or converted via the logistic function to a probability of class membership given the extracted features.

A rule-based classifier applies a set of logical rules to the extracted features to select an output class. Generally, the rules are applied in order, with the logical result at each step influencing the analysis at later steps. The specific rules and their sequence can be determined from any or all of training data, analogical reasoning from previous cases, or existing domain knowledge. One example of a rule-based classifier is a decision tree algorithm, in which the values of features in a feature set are compared to corresponding threshold in a hierarchical tree structure to select a class for the feature vector. A random forest classifier is a modification of the decision tree algorithm using a bootstrap aggregating, or "bagging" approach. In this approach, multiple decision trees are trained on random samples of the training set, and an average (e.g., mean, median, or mode) result across the plurality of decision trees is returned. For a classification task, the result from each tree would be categorical, and thus a modal outcome can be used, but a continuous parameter can be computed according to a number of decision trees that select a given task. Regardless of the specific model employed, the clinical parameter generated at the image evaluation component 208 can be provided to a user via a user interface 210 or stored on a non-transitory computer readable medium, for example, in an electronic medical record associated with the patient.

In some implementations, aspects of the system 200 can also be tuned for a specific pathology or targeted segmentation of retinal layers. For example, if the retinal sublayer boundaries of interest were the internal limiting membrane and the retinal pigment epithelium, the threshold for suitable image quality can be reduced, but to segment photoreceptor layers, such as the ellipsoid zone, or fluid features, a higher quality image is needed. In addition, the weighting of various inputs can be altered based on the targeted retinal layer or the pathology of interest. The system 200 can also utilize multiple specific models to fine tune quality scores towards specific pathologies and retinal boundaries of interest.

Figure 3:
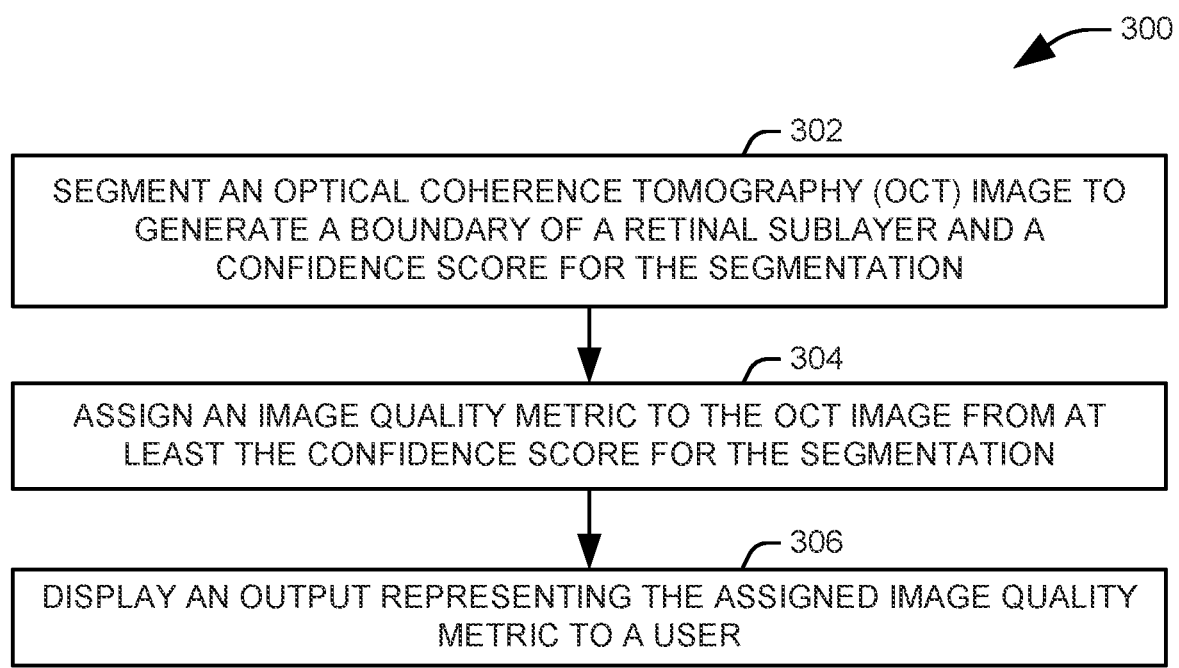
FIG. 3 illustrates one example of a method for evaluating a quality of an OCT image.
Figure 4:
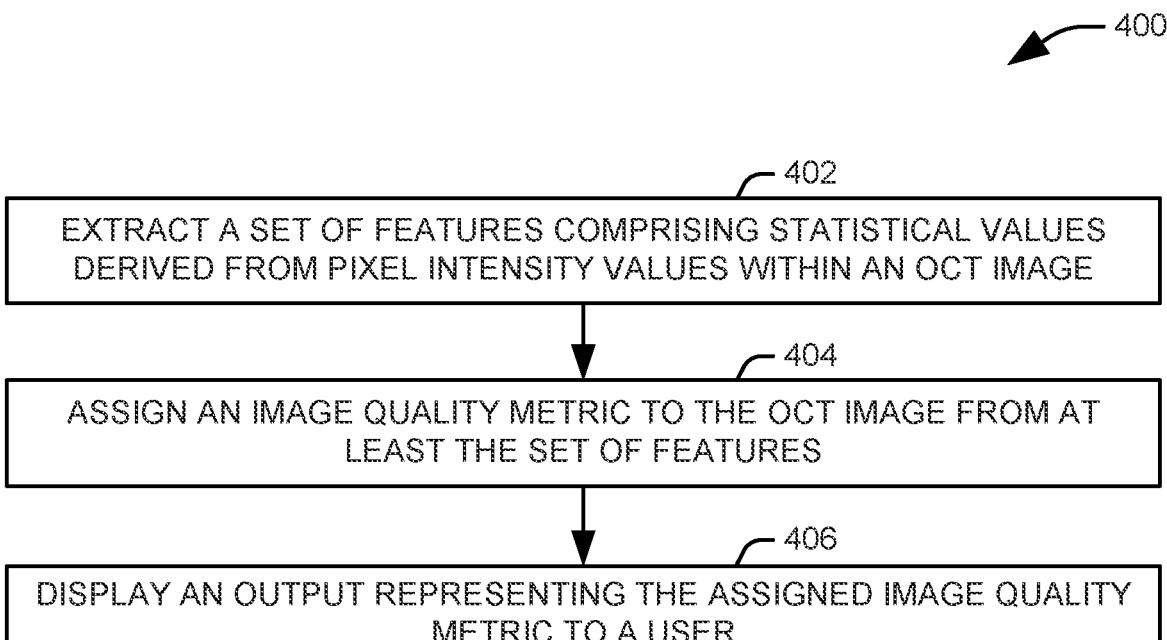
FIG. 4 illustrates another example of a method for evaluating a quality of an OCT image.

In view of the foregoing features described above, example methods will be better appreciated with reference to FIGS. 3 and 4. While, for purposes of simplicity of explanation, the method is shown and described as executing serially, it is to be understood and appreciated that the method is not limited by the illustrated order, as parts of the method could occur in different orders and/or concurrently from that shown and described herein.

FIG. 3 illustrates one example of a method 300 for evaluating a quality of an OCT image. The OCT image can be acquired at an OCT imager, such as a spectral domain OCT scanner, and provided to a system for analysis of the image quality. At 302, an OCT image is segmented to generate a boundary of a retinal sublayer and a confidence score for the segmentation. For example, the confidence score for the segmentation can be calculated as a percentage of pixels along one axis of the image for which the boundary of the retinal sublayer is detected. In one implementation, each A-scan of the OCT image can be segmented to generate a confidence score for that A-scan, and the confidence scores can be averaged across all of the A-scans to produce an overall confidence score for the OCT image. In another example, the confidence score for each A-scan can be aggregated into a feature vector, with score for each A-scan used as an independent feature in evaluating the OCT image. In one example, the OCT image is provided to a machine learning model, such as a convolutional neural network, that is trained on a set of OCT images segmented by experts.

At 304, an image quality metric is assigned to the OCT image from at least the confidence score for the segmentation. In one example, one or more confidence scores associated with the OCT image are provided to a machine learning model trained on a set of OCT images having known quality metrics to provide the image quality metric. In one implementation, a plurality of additional features can be extracted from the OCT image, and the image quality metric can be assigned according to the confidence score for the segmentation and the plurality of features. In this implementation, the plurality of features can include a set of descriptive statistics derived from pixel signal intensity values within the image, such as a measure of central tendency of the pixel signal intensity values, a measure of deviation of the pixel signal intensity values, a kurtosis of the distribution of the pixel signal intensity values, a skew of the distribution of the pixel signal intensity values, and a measure of homogeneity of the pixel signal intensity values. At 306, an output representing the assigned image quality metric is displayed to a user. In one example, the output representing the assigned image quality metric is a categorical parameter that can assume a plurality of values, the plurality of values comprising a first value, indicating that the OCT image is suitable for analysis by a user, and a second value, indicating that the OCT image is not suitable for analysis by a user.

FIG. 4 illustrates another example of a method 400 for evaluating a quality of an OCT image. The OCT image can be acquired at an OCT imager, such as a spectral domain OCT scanner, and provided to a system for analysis of the image quality. At 402, a plurality of features comprising statistical values derived from pixel intensity values are extracted from an OCT image. In one implementation, the plurality of features include a set of descriptive statistics derived from pixel signal intensity values within the image, including at least one of a measure of central tendency of the pixel signal intensity values, a measure of deviation of the pixel signal intensity values, a kurtosis of the distribution of the pixel signal intensity values, a skew of the distribution of the pixel signal intensity values, and a measure of homogeneity of the pixel signal intensity values. In another example, the plurality of features includes each of a measure of central tendency of the pixel signal intensity values, a measure of deviation of the pixel signal intensity values, a kurtosis of the distribution of the pixel signal intensity values, a skew of the distribution of the pixel signal intensity values, and a measure of homogeneity of the pixel signal intensity values.

At 404, an image quality metric to the OCT image from at least the plurality of features. In one example, the image quality metric is assigned to the OCT image by providing the plurality of features to a machine learning model trained on a set of OCT images having known quality metrics. In one implementation, one or more additional features can be generated by segmenting the OCT image to generate a boundary of a retinal sublayer and a confidence score for the segmentation, with one or more confidence scores from the segmentation used along with the plurality of features for assigning the image quality metric to the OCT image. At 406, an output representing the assigned image quality metric is displayed to a user. In one implementation, the output representing the image quality metric can assume a "good" value, indicating an image with minimal defects that is suitable for analysis by a user, a "fair" value, representing an image that is suitable for analysis despite notable defects, and a "poor" value, representing an image that is not suitable for analysis.

Figure 5:
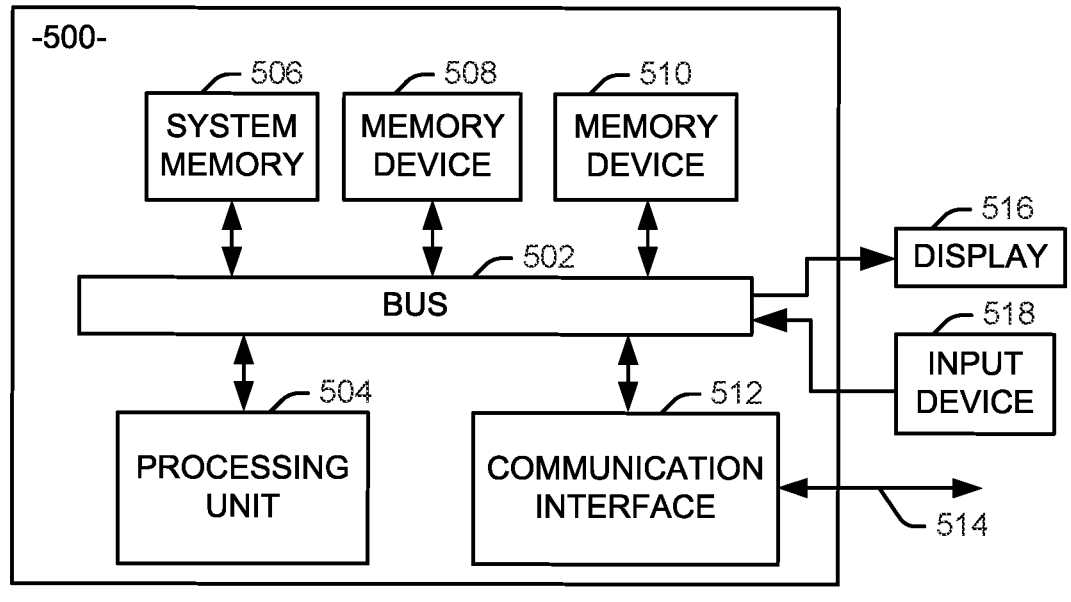
FIG. 5 is a schematic block diagram illustrating an exemplary system of hardware components capable of implementing examples of the systems and methods disclosed in FIGS. 1-4.

FIG. 5 is a schematic block diagram illustrating an exemplary system 500 of hardware components capable of implementing examples of the systems and methods disclosed herein. The system 500 can include various systems and subsystems. The system 500 can be a personal computer, a laptop computer, a workstation, a computer system, an appliance, an application-specific integrated circuit (ASIC), a server, a server BladeCenter, a server farm, etc.

The system 500 can include a system bus 502, a processing unit 504, a system memory 506, memory devices 508 and 510, a communication interface 512 (e.g., a network interface), a communication link 514, a display 516 (e.g., a video screen), and an input device 518 (e.g., a keyboard, touch screen, and/or a mouse). The system bus 502 can be in communication with the processing unit 504 and the system memory 506. The additional memory devices 508 and 510, such as a hard disk drive, server, standalone database, or other non-volatile memory, can also be in communication with the system bus 502. The system bus 502 interconnects the processing unit 504, the memory devices 506-510, the communication interface 512, the display 516, and the input device 518. In some examples, the system bus 502 also interconnects an additional port (not shown), such as a universal serial bus (USB) port.

The processing unit 504 can be a computing device and can include an application-specific integrated circuit (ASIC). The processing unit 504 executes a set of instructions to implement the operations of examples disclosed herein. The processing unit can include a processing core.

The additional memory devices 506, 508, and 510 can store data, programs, instructions, database queries in text or compiled form, and any other information that may be needed to operate a computer. The memories 506, 508 and 510 can be implemented as computer-readable media (integrated or removable), such as a memory card, disk drive, compact disk (CD), or server accessible over a network. In certain examples, the memories 506, 508 and 510 can comprise text, images, video, and/or audio, portions of which can be available in formats comprehensible to human beings. Additionally or alternatively, the system 500 can access an external data source or query source through the communication interface 512, which can communicate with the system bus 502 and the communication link 514.

In operation, the system 500 can be used to implement one or more parts of a system, such as that illustrated in FIG. 1. Computer executable logic for implementing the system resides on one or more of the system memory 506, and the memory devices 508 and 510 in accordance with certain examples. The processing unit 504 executes one or more computer executable instructions originating from the system memory 506 and the memory devices 508 and 510. The term "computer readable medium" as used herein refers to a medium that participates in providing instructions to the processing unit 504 for execution. This medium may be distributed across multiple discrete assemblies all operatively connected to a common processor or set of related processors.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system for evaluating a quality of an optical coherence tomography (OCT) image, the system comprising:
   a processor; and
   a non-transitory computer readable medium that stores instructions executable by a processor to evaluate the quality of the OCT image, the executable instructions comprising:
   an imager interface that receives an OCT image from an associated OCT imager;
   a feature extractor that generates at least one feature from the OCT image, the feature extractor including a segmentation component that segments the OCT image to generate a boundary of a retinal sublayer and a confidence score for the segmentation, the at least one feature including the confidence score for the segmentation;
   an image evaluator that determines an image quality metric from the at least one feature; and
   a user interface that provides an output representing the image quality metric to a display.

2. The system of claim 1, wherein the segmentation component calculates the confidence score for the segmentation as a percentage of pixels along one axis of the image for which the boundary of the retinal sublayer is detected.

3. The system of claim 1, wherein the segmentation component comprises a convolutional neural network trained on a set of OCT images segmented by experts.

4. The system of claim 1, wherein the feature extractor generates a plurality of features from the OCT image, the plurality of features comprising a set of descriptive statistics derived from pixel signal intensity values within the image that includes at least one of a measure of central tendency of the pixel signal intensity values, a measure of deviation of the pixel signal intensity values, a kurtosis of the distribution of the pixel signal intensity values, and a skew of the distribution of the pixel signal intensity values.

5. The system of claim 1, wherein the at least one feature is a plurality of features, and the image evaluator comprises a machine learning model, trained on a set of OCT images having associated sets of the plurality of features, that provides the image quality metric from the plurality of features associated with the OCT image.

6. The system of claim 5, wherein the machine learning model is implemented as a random forest classifier.

7. A method for evaluating the quality of an optical coherence tomography (OCT) image, the method comprising:
   extracting a plurality of features from the OCT image;
   segmenting the OCT image to generate a boundary of a retinal sublayer and a confidence score for the segmentation;
   assigning an image quality metric to the OCT image from at least the confidence score for the segmentation and the plurality of features; and
   displaying an output representing the image quality metric to a user.

8. The method of claim 7, wherein the confidence score for the segmentation is calculated as a percentage of pixels along one axis of the image for which the boundary of the retinal sublayer is detected.

9. The method of claim 7, wherein the plurality of features comprise a set of descriptive statistics derived from pixel signal intensity values within the image, the set of descriptive statistics comprising at least one of a measure of central tendency of the pixel signal intensity values, a measure of deviation of the pixel signal intensity values, a kurtosis of the distribution of the pixel signal intensity values, a skew of the distribution of the pixel signal intensity values, and a measure of homogeneity of the pixel signal intensity values.

10. The method of claim 7, wherein assigning the image quality metric to the OCT image from the confidence score comprises providing the confidence score to a machine learning model trained on a set of OCT images having known quality metrics.

11. The method of claim 7, wherein segmenting an OCT image comprises providing the OCT image to a machine learning model trained on a set of OCT images segmented by experts.

12. The method of claim 7, further comprising acquiring the OCT image from a spectral domain OCT scanner.

13. The method of claim 7, wherein the output representing the assigned image quality metric is a categorical parameter that can assume a plurality of values, the plurality of values comprising a first value, indicating that the OCT image is suitable for analysis by a user, and a second value, indicating that the OCT image is not suitable for analysis by a user.

* * * * *